3,255,905
UTILITY CART
George P. Cochran, P.O. Box 2496, Birmingham, Ala.
Filed Nov. 13, 1963, Ser. No. 323,417
4 Claims. (Cl. 214—372)

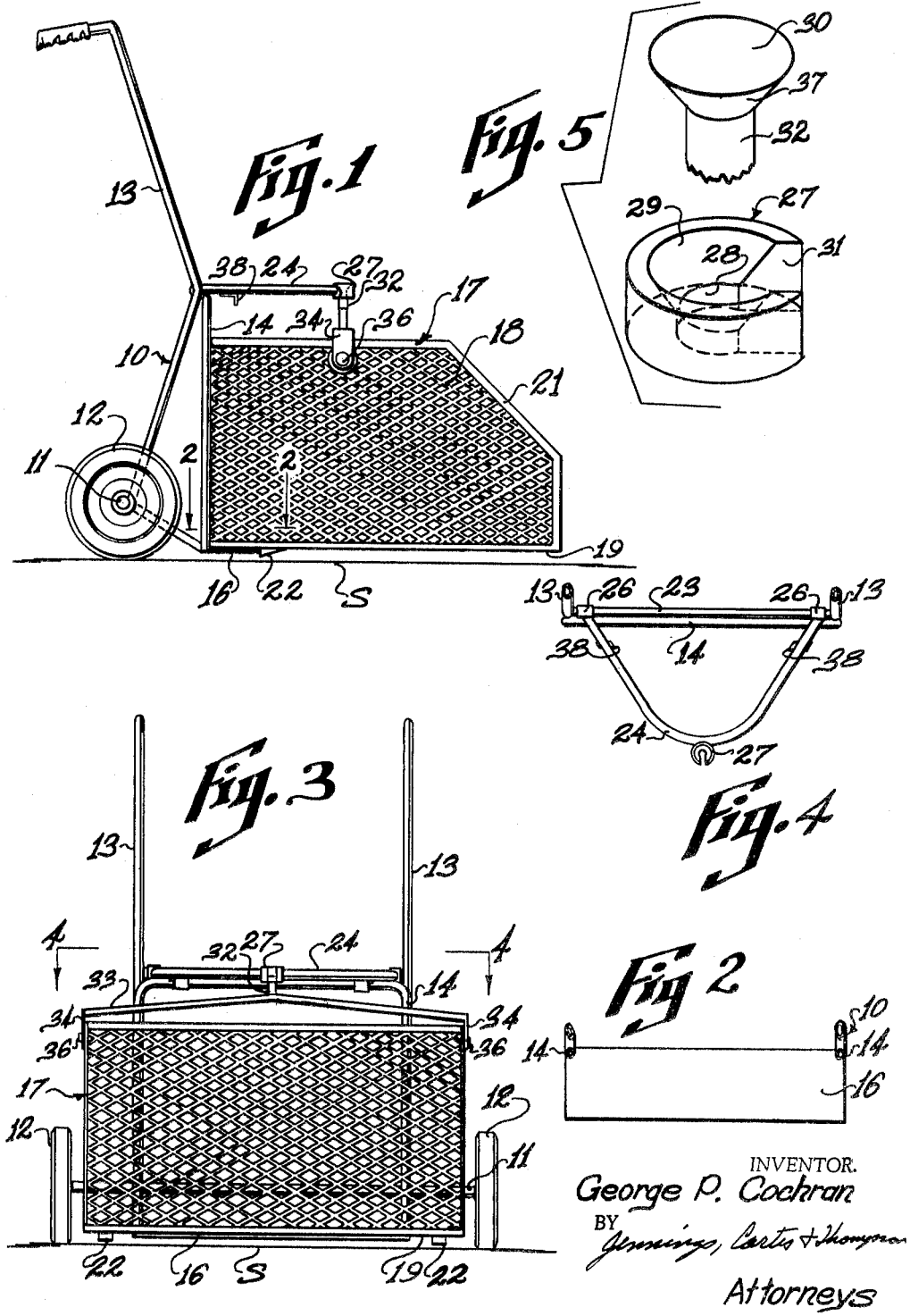

This invention relates to a utility cart and more particularly to such a cart which shall be adapted to transport various type materials, such as grass, dirt, sand, fertilizer, garden tools, wood, trash, garbage and the like.

An object of my invention is to provide a utility cart of the character designated in which a translatable frame is detachably connected to a receptacle whereby selected types of receptacles may be employed with the frame.

Another object of my invention is to provide a utility cart of the character designated which shall include improved means for detachably connecting the translatable frame to the receptacle whereby the receptacle is attached by merely moving the translatable frame to proper position and then pivoting the frame about a horizontal axis.

A further object of my invention is to provide a utility cart of the character designated which shall be so constructed that it is adapted for transporting other articles when not employed to transport receptacles.

A still further object of my invention is to provide a utility cart of the character designated which shall be extremely simple of construction and manufacture and one which requires a minimum of effort to change receptacles.

Briefly, my improved utility cart comprises a translatable frame which is mounted for pivotal movement about a horizontal axis. A forwardly extending support member is mounted adjacent the bottom of the frame in position to support a receptacle thereon. The receptacle is provided with depending members which are adapted to engage a supporting surface whereby the rear portion of the receptacle is held in an elevated position for receiving the support member. The upper portion of the receptacle is detachably connected to the frame by an arm member which extends forwardly of the frame. Cooperating locking elements are carried by the arm and the receptacle whereby upon pivotal movement of the frame, by a rearwardly extending handle, the locking elements engage each other to thus secure the receptacle in place.

A utility cart embodying features of my invention is illustrated in the accompanying drawing, forming a part of this application, in which:

FIG. 1 is a side elevational view of the cart;

FIG. 2 is a fragmental sectional view taken generally along the line 2—2 of FIG. 1;

FIG. 3 is a front elevational view of the cart;

FIG. 4 is a fragmental view taken generally along the line 4—4 of FIG. 3 showing the forwardly extending arm and the locking element carried thereby; and, FIG. 5 is an exploded view showing the cooperating locking elements which detachably connect the receptacle to the frame.

Referring now to the drawing for a better understanding of my invention, I show a translatable frame 10 which is supported by a horizontal axle 11 whereby the frame is adapted for pivotal movement about a horizontal axis. Wheels 12 are mounted on the axle 11 at opposite sides of the frame, as shown in FIG. 3, and handles 13 extend rearwardly of the frame whereby the frame may be pivoted about the axle 11 and moved from place to place. Preferably, the handles 13 are formed integrally with the frame 10 and the frame is provided with an inverted U-shaped member 14 which is connected at its lower ends to a transverse support member 16 in the form of a forwardly extending plate.

The forwardly extending plate 16 is adapted to be inserted beneath the rear portion of a receptacle 17 which is preferably open at the top and at its forward end for receiving materials to be transported therein. Where the receptacle 17 is employed to convey materials, such as leaves, grass and the like, the sides and rear wall are formed of an open mesh material, such as expanded metal 18. On the other hand, where the receptacle is employed to transport small particle size materials, such as sand, dirt and the like, the side walls and back are formed of an imperforate material. The bottom of the receptacle 17, indicated at 19, is formed of an imperforate material, such as sheet metal or the like. Preferably, the upper forward portion of each side wall of the receptacle 17 is cut away so as to provide a downwardly and forwardly sloping forward edge 21, as shown in FIG. 1.

The rear portion of the receptacle 17 is held in elevated position relative to a supporting surface S by depending members 22 which are spaced from each other a distance to receive the forwardly extending support plate 16, as shown in FIG. 3. The under surface of each depending member 22 slopes upwardly and forwardly, as shown in FIG. 1, whereby the depending members slide over any subjacent obstacles, such as roots, rocks and the like.

Extending transversely of the frame 10 adjacent the upper edge of the inverted U-shaped member 14 is a bar 23. Mounted for pivotal movement on the bar 23 is a forwardly extending arm 24, which is generally U-shaped, as viewed in FIG. 4. The rear ends of the U-shaped arm 24 carry bearing members 26 which are adapted to rotate relative to the bar 23.

A socket member 27 is secured to the forward end of the arm 24 whereby it is positioned over the receptacle 17, as shown in FIG. 1 while the arm 24 is in a horizontal position. The arm 24 is maintained in a horizontal position by its engagement with the upper surface of the inverted U-shaped member 14. The socket 27 is provided with a vertical opening 28 therethrough. The upper portion of the opening 28 flares outwardly and upwardly as at 29, as shown in FIG. 5. A forwardly opening slot 31 is provided in the socket 27 for receiving an upstanding member 32 which is carried by a transverse member 33. The ends of the transverse member 33 extend downwardly as at 34 and are secured to the sides of the receptacle 17 by suitable securing members 36. As shown in FIG. 5, the upper end 30 of the upstanding member 32 is enlarged and is provided with an undersurface 37 which flares outwardly and upwardly whereby it conforms to the inner surface of the outwardly and upwardly flaring portion 29 of the socket 27. Accordingly, upon insertion of the upstanding member 32 through the slot 31, the socket 27 is adapted to move upwardly relative to the upwardly and outwardly flaring surface 37 whereby the arm 24 is detachably connected to the receptacle 17.

From the foregoing description, the operation of my utility cart will be readily understood. With the receptacle 17 resting on a supporting surface S, the depending brackets 22 hold the rear portion of the receptacle at an elevation for receiving the forwardly extending support plate 16. Upon forward movement of the translatable frame 10, the support plate 16 moves to the position shown in FIG. 1 whereby the rear wall of the receptacle 17 engages the inverted U-shaped member 14. Also, upon forward movement of the frame 10, the upstanding member 32 enters the slot 31 of the socket 27 whereby the upstanding member 32 is adapted for axial movement within the opening 28. With the frame 10 thus positioned relative to the receptacle 17, the handles 13 are moved rearwardly whereby the frame 10 rotates about the horizontal axle 11 whereupon the support plate 16 is lifted into engagement with the under surface of the receptacle 17. Also, upon pivotal movement of the frame 10 about the horizontal axis, the socket 27 moves upwardly relative to the outwardly and upwardly flaring under surface 37 of the upstanding member 32 whereby the surfaces 29 and 37 engage each other to thereby detachably connect the frame 10 to the receptacle 17. In view of the fact that the enlarged portion 30 of the upstanding member 32 is too large to pass through the slot 31, the socket 27 and the upstanding member 32 form locking elements which prevent separation of the arm 24 from the receptacle 17 until the handles 13 are pivoted in a forward direction to thereby lower the arm 24 and the support plate 16 whereupon the frame 10 may be readily separated from the receptacle 17.

Various types and sizes of receptacles 17 may be detachably connected to the frame 10 by merely providing upstanding members 32 on the receptacles in position to engage the socket 27. As shown in FIGS. 1 and 4, depending catch members 38 are provided on the legs of the U-shaped arm 24 in position to engage the inner surface of a receptacle whereby a receptacle is held in place on the support plate 16. That is, the depending members 38 are particularly adapted for engaging the inner surface of a cylindrical-like receptacle, such as a garbage can, which is of a height to be supported by the support plate 16 with the upper inner edge thereof in contact with the depending members 38.

From the foregoing, it will be seen that I have devised an improved utility cart which is adapted for use with various type receptacles. By providing quick release means for detachably connecting a translatable frame to a receptacle, the type and size of receptacle may be changed with a minimum of effort. Also, by providing a receptacle which is supported at an elevation for receiving the forwardly extending support plate, together with cooperating locking elements which move into locking engagement upon rotation of the translatable frame 10 about its horizontal axis, the support plate 16 moves into engagement with the under surface of the receptacle 17 and at the same time the locking element 27 moves into engagement with the outwardly and upwardly flaring under surface 37 of the upstanding member 32.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A utility cart comprising:
    (a) a translatable frame supported for pivotal movement about a horizontal axis,
    (b) a forwardly extending support member adjacent the bottom of said frame,
    (c) a receptacle of a shape and size for the rear portion thereof to be supported by said support member,
    (d) depending members carried by said receptacle in position to engage a supporting surface and hold the rear portion of said receptacle in spaced relation to the supporting surface for receiving said support member,
    (e) a forwardly extending arm supported adjacent its rear end by said translatable frame,
    (f) a first locking element carried by said receptacle,
    (g) a cooperating locking element carried by said forwardly extending arm in position to engage said first locking element upon pivotal movement of said frame about said horizontal axis in a direction to lift said support member and to disengage said first locking element upon pivotal movement of said frame in the opposite direction whereby said forwardly extending arm is detachably connected to said receptacle,
    (h) a rearwardly extending handle carried by said frame to impart pivotal movement to said frame, and
    (i) one of the locking elements having a socket for receiving the other locking element with said socket being provided with an outwardly opening slot therein for receiving said other locking element.

2. A utility cart as defined in claim 1 in which said first locking element is carried by the central portion of a transverse member which is attached at opposite ends to said receptacle and said forwardly extending arm extends over said receptacle in position for said cooperating locking element to engage said first locking element upon pivotal movement of the frame in a direction to lift said support member.

3. A utility cart as defined in claim 1 in which depending catch members are carried by said arm in position to engage a receptacle.

4. A utility cart comprising:
    (a) a translatable frame supported for pivotal movement about a horizontal axis,
    (b) a forwardly extending support plate adjacent the bottom of said frame,
    (c) a forwardly opening receptacle of a shape and size for the rear portion thereof to be supported by said support plate,
    (d) depending members carried by said receptacle in position to engage a supporting surface outwardly of said support plate and hold the rear portion of said receptacle in spaced relation to the supporting surface for receiving said support plate,
    (e) a forwardly extending arm pivotally connected against its rear end to said frame with its forward end disposed to extend over the central portion of said receptacle,
    (f) an outwardly and upwardly flaring socket adjacent the forward end of said arm,
    (g) there being a forwardly opening slot in said socket,
    (h) a transverse member secured at opposite ends to said receptacle,
    (i) an upstanding member carried by said transverse member in position to enter said forward opening slot in said socket,
    (j) the upper end of said upstanding member being enlarged and having an outwardly and upwardly flaring under surface adapted to cooperate with said socket whereby said forwardly extending arm is detachably connected to said receptacle, and
    (k) a rearwardly extending handle carried by said frame to impart pivotal movement to said frame.

References Cited by the Examiner

UNITED STATES PATENTS

| | | | |
|---|---|---|---|
| 1,574,501 | 2/1926 | O'Brien | 214—372 |
| 1,742,735 | 1/1930 | Strippel | 214—380 |
| 2,476,539 | 7/1949 | Fortin | 214—380 |
| 2,605,005 | 7/1952 | Wenzel et al. | 214—356 |

GERALD M. FORLENZA, *Primary Examiner.*

ALBERT J. MAKAY, *Assistant Examiner.*